July 20, 1943.   E. O. BURLING   2,324,470

FREESTONE PEACH PITTER

Filed Aug. 19, 1941

Inventor
Eathel O. Burling

By Lyon & Lyon
Attorneys

Patented July 20, 1943

2,324,470

UNITED STATES PATENT OFFICE 2,324,470

FREESTONE PEACH PITTER

Eathel O. Burling, Yakima, Wash., assignor to Pacific Machinery Company, San Francisco, Calif., a corporation of California Application August 19, 1941, Serial No. 407,432

3 Claims. (Cl. 146—30)

This invention relates to a device for the removal of the pits or stones from fruit having easily separated pits or stones as, for example, freestone peaches.

In the removal of the pits from fruit of the character of freestone peaches, it is only necessary to sever the flesh of the fruit around the pit in such manner as to open the pit recesses and to then loosely grip the pit in such manner that the two halves of the fruit may be separated from the pit or stone. In the preparation of fruit halves, however, it is desirable that the two halves of the fruit be completely cut so as to avoid pulling of the flesh of the fruit at uncut sections of the two halves and to avoid the forcing of the halves of the fruit over the freed pit or stone in any manner which tends to tear or disfigure the flesh of the fruit or the pit cavity.

It is therefore an object of this invention to provide a freestone peach pitter which includes a severing blade adapted to completely ring and cut the flesh of the fruit around a pit, and means which will temporarily hold the fruit pit so that the two halves of the fruit may be separated from the pit by a simple rotary movement.

Another object of this invention is to provide a device for the removal of pits or stones from fruit of the character of freestone peaches which includes a blade having a pit passage formed therein terminating in a restricted section adapted to retain the pit of the fruit, and means for limiting the extent of movement of the fruit over the blade requiring a rotary movement of the fruit halves in order to separate the fruit halves from the held pit or stone.

Other objects and advantages of this invention it is believed will be apparent from the following detailed description of a preferred embodiment thereof as illustrated in the accompanying drawing.

Figure 1:
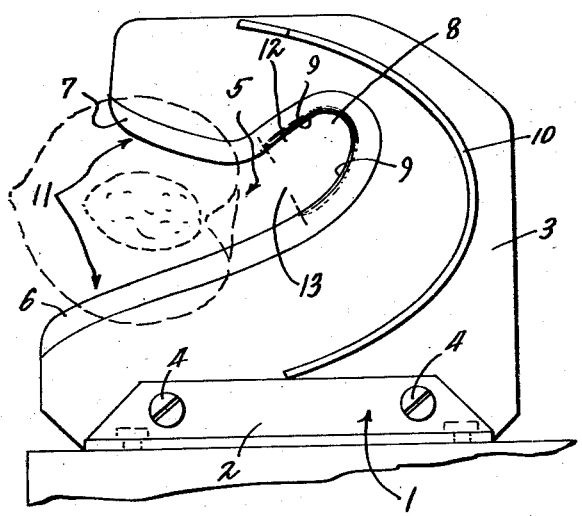
Figure 1 is a side elevation of a fruit pitter embodying my invention.
Figure 2:
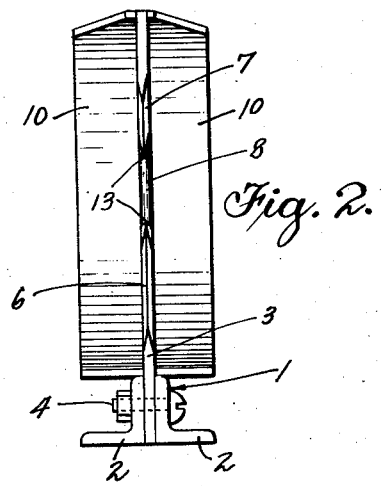
Figure 2 is a front elevation thereof.
Figure 3:
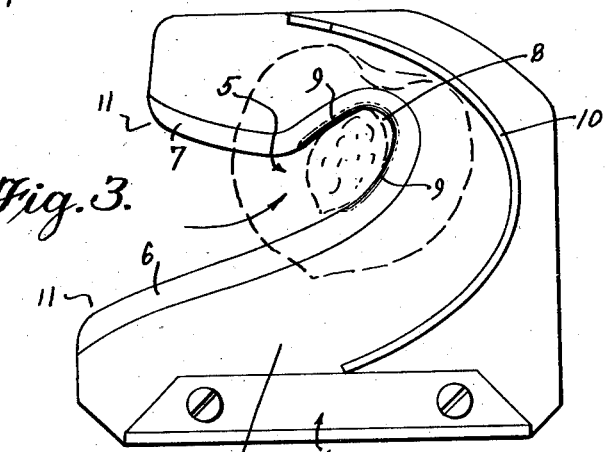
Figure 3 is a side elevation similar to Figure 1 illustrating the operation of the fruit pitter embodying my invention and terminating the movement of the fruit and holding of the fruit pit preparatory to the separation of fruit halves from the pit.
Figure 4:
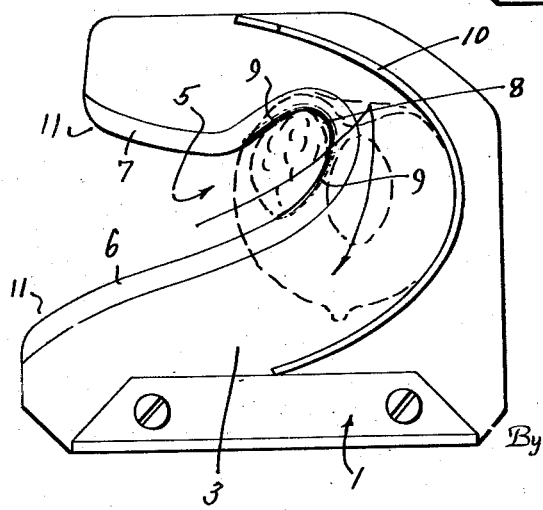
Figure 4 is a view similar to Figure 3 illustrating the final separation of a fruit half from the pit along the surface of the limiting flange.

In the preferred embodiment of my invention as illustrated in the accompanying drawing, 1 indicates a base adapted to be secured to any suitable type of table or support and includes a pair of angles 2 between which the halving blade 3 is secured by means of bolts 4. The halving blade 3 is provided with a pit path 5 formed by making in the blade a pit entry recess upon the upper and lower edges of which there are formed the cutting edges 6 and 7 which terminate in the pit pocket 8 where the edges 9 are dulled so as to avoid cutting into the pit or stone of the fruit. Carried on the two surfaces of the halving blade 3 are curved flanges 10 which are limit flanges in that they limit the extent of movement of the peach or fruit over the opposed faces of the halving blade 3.

The pit path 5 is formed in the blade 3 with an open mouth 11 exceeding considerably the dimensions of the pit of the fruit to be pitted and in fact, exceeding the diameter of the fruit so that the cutting edges 6 and 7 at the mouth may act from the periphery of the fruit to cut the flesh of the fruit as it is moved into the mouth 11 of the path 5. The path 5 is formed in such manner that it curves upwardly in its rearmost section 12 from a throat 13 at which point the cutting edges 6 and 7 terminate.

The operation and relationship of the parts of the fruit pitter embodying my invention are:

A fruit adapted to be pitted, of the freestone variety as hereinabove set forth, is gripped in the two hands of the operator and pressed into the mouth 11 of the pit path 5 with the edges 6 and 7 lying in the plane in which the pit within the fruit lies as is determined by the exterior formation of the fruit. The fruit is then progressed into the path 5 so that the edges 6 and 7 cut through the flesh of the fruit down to the pit. On reaching the throat 13 the fruit is rotated so as to cause the pit to pass into the pit pocket 8 where, upon further rotation of the fruit, the flesh of the fruit is completely severed around the pit. The rear edge 9 of the pit pocket terminates the movement of the pit and as the edges 9 of the pit pocket are not sharpened, they merely act to grip the pit or stone of the fruit as the fruit is rotated.

Correlated with the rear of the pit pocket 8 and the size of the fruit being pitted are the flanges 10 so that they engage the outer periphery of the fruit halves at substantially the instant the pit engages the rear of the pit pocket 8, preventing the operator from further thrusting the fruit over the surfaces of the halving blade 3. These limiting flanges therefore prevent the operator from tearing the two halves of the fruit from the fruit pit necessitating the operator's rotating the two halves and applying a downward pressure thereto during rotation before the two halves may be separated from the pit or stone. This action results in the blades completely ringing the flesh of the fruit around the pit so that when the two halves separate from the pit the flesh of the fruit has been completely cut around the pit and none of the flesh is torn between the halves.

The rear of the slot 5 forming the pocket 8 is curved upwardly from the throat 13 so that the operator in moving the fruit over the blade 3 rotates the fruit in moving the pit into the pocket 8, thereby tending to ring the fruit flesh around the pit as the pit is located in the pocket 8.

The operation is extremely rapid, only requiring the operator to thrust the fruit through the path 5 until the pit strikes the end of the pit pocket 8 and the periphery of the fruit is engaged by the limit flanges 10. By then applying a twisting action and a downward pressure to the fruit, the two halves are separated from the pit as the pit is retained in the pit pocket. As the two halves are removed from the blade 3, the pit then falls out of the pit pocket 8 permitting a second operation to be performed.

Having fully described my invention, it is to be understood that I do not wish to be limited to the details herein set forth, but my invention is of the full scope of the appended claims.

I claim:

1. A device for pitting fruit of the freestone variety, including a halving blade adapted to be supported in a substantially vertical plane, the blade having a pit path formed therein, the edges of the blade in the path being sharpened to provide means for cutting the flesh of the fruit to the depth of the pit, the path terminating in a pit pocket extending at an angle from the said cutting edges and limiting flanges carried by the blade against which the periphery of the fruit is engaged to require rotation of the fruit halves to separate the halves from the pit.

2. In a freestone fruit pitting device, the combination of a blade having a pit path formed therein, the edges of the blade in the path being sharpened to provide cutting means for cutting the flesh of the fruit to the depth of the pit, and the pit path terminating in a pit pocket the edges of which are dulled, curved limiting flanges secured to the opposed faces of the halving blade and positioned with reference to the pit pocket to engage the outer periphery of the fruit when the pit is located in the pit pocket.

3. In a device for pitting fruit of the freestone variety, including a halving blade having a pit path formed therein, the edges of the path being sharpened to provide means for cutting the flesh of the fruit to the depth of the pit, and the path terminating in a pit pocket extending upwardly at an angle from the sharpened portion of the path, and the edges of the path being dulled in the pit pocket, and limiting flanges carried by the blade to restrict movement of the fruit over the blade whereby rotation of the fruit halves is required to separate the halves from the pit, and whereby the pit is wedged in the pit pocket during twisting of the fruit halves.

EATHEL O. BURLING.